(12) United States Patent
Abedini et al.

(10) Patent No.: US 10,797,842 B2
(45) Date of Patent: Oct. 6, 2020

(54) MULTIPLEXING BROADCAST CHANNELS WITH SYNCHRONIZATION SIGNALS IN NEW RADIO

(71) Applicant: QUALCOMM Incorporated, San Diego, CA (US)

(72) Inventors: Navid Abedini, Raritan, NJ (US); Hung Ly, San Diego, CA (US); Tao Luo, San Diego, CA (US); Tingfang Ji, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 15/902,677

(22) Filed: Feb. 22, 2018

(65) Prior Publication Data

US 2018/0302205 A1 Oct. 18, 2018

Related U.S. Application Data

(60) Provisional application No. 62/569,457, filed on Oct. 6, 2017, provisional application No. 62/485,547, filed on Apr. 14, 2017.

(51) Int. Cl.
*H04L 5/00* (2006.01)
*H04W 72/04* (2009.01)
*H04J 11/00* (2006.01)
*H04W 56/00* (2009.01)

(52) U.S. Cl.
CPC ........ *H04L 5/0051* (2013.01); *H04J 11/0073* (2013.01); *H04J 11/0076* (2013.01); *H04L 5/005* (2013.01); *H04L 5/0053* (2013.01); *H04W 56/0035* (2013.01); *H04W 72/0453* (2013.01); *H04J 11/0023* (2013.01)

(58) Field of Classification Search
None
See application file for complete search history.

(56) References Cited

U.S. PATENT DOCUMENTS

| 2014/0126498 | A1 | 5/2014 | Koorapaty et al. | |
| 2017/0251443 | A1* | 8/2017 | Shin | H04L 5/001 |
| 2017/0251455 | A1* | 8/2017 | Shin | H04L 5/001 |

(Continued)

OTHER PUBLICATIONS

International Search Report and Written Opinion—PCT/US2018/019484—ISA/EPO—dated Jun. 13, 2018.

(Continued)

*Primary Examiner* — Donald L Mills
(74) *Attorney, Agent, or Firm* — Linda G. Gunderson; Patterson & Sheridan LLP

(57) ABSTRACT

Certain aspects of the present disclosure relate to methods and apparatus for multiplexing new radio (NR) physical broadcast channels (NR-PBCHs) with NR synchronization signals. An exemplary method that may be performed by a wireless node includes determining a frequency offset to use in transmitting one or more synchronization signals and one or more physical broadcast channels (PBCHs) and transmitting the one or more synchronization signals, using a synchronization signal (SS) transmission band having an SS center frequency, and the one or more PBCHs, using a PBCH transmission band having a PBCH center frequency that differs from the SS center frequency by the determined frequency offset.

28 Claims, 16 Drawing Sheets

(56) References Cited

U.S. PATENT DOCUMENTS

| | | | | |
|---|---|---|---|---|
| 2018/0123849 A1* | 5/2018 | Si | .......................... | H04J 11/0073 |
| 2018/0124744 A1* | 5/2018 | Xue | ......................... | H04W 4/70 |
| 2018/0270008 A1* | 9/2018 | Yi | .......................... | H04J 11/0069 |
| 2019/0045553 A1* | 2/2019 | Zhang | ..................... | H04W 4/80 |
| 2019/0191417 A1* | 6/2019 | Baldemair | ............ | H04W 72/04 |
| 2019/0229867 A1* | 7/2019 | Yi | .......................... | H04L 5/0048 |
| 2019/0239175 A1* | 8/2019 | Kim | ......................... | H04J 11/00 |

OTHER PUBLICATIONS

Samsung: "SS Frequency Raster for NR", 3GPP Draft; R1-1705319, 3rd Generation Partnership Project (3GPP), Mobile Competence Centre, 650, Route Des Lucioles, F-06921 Sophia-Antipolis Cedex, France, vol. RAN WG1, No. Spokane, USA; 20170403-20170407, Apr. 2, 2017 (Apr. 2, 2017), XP051243449, 4 Pages, Retrieved from the Internet: URL:http://www.3gpp.org/ftp/Meetings_3GPP_SYNC/RAN1/Docs/ [retrieved on Apr. 2, 2017].

Zte et al., "SS Frequency Raster". 3GPP Draft, R1-1704359, 3rd Generation Partnership Project (3GPP). Mobile Competence Centre, 650, Route Des Lucioles, F-06921 Sophia-Antipolis Cedex; France, vol. RAN WG1, No. Spokane, USA; 20170403-20170407, Apr. 2, 2017 (Apr. 2, 2017), XP051242507, 6 Pages, Retrieved from the Internet: URL:http://www.3gpp.org/ftp/Meetings_3GPP_SYNC/RAN1/Docs/-[retrieved on Apr. 9, 2017].

* cited by examiner

MULTIPLEXING BROADCAST CHANNELS WITH SYNCHRONIZATION SIGNALS IN NEW RADIO

CROSS-REFERENCE TO RELATED APPLICATIONS

The present Application for Patent claims priority to U.S. Provisional Application No. 62/485,547, filed Apr. 14, 2017, and U.S. Provisional Application No. 62/569,457, filed Oct. 6, 2017, which are assigned to the assignee of the present application and hereby expressly incorporated by reference herein in their entireties

FIELD

The present disclosure relates generally to wireless communication systems, and more particularly, to methods and apparatus for multiplexing new radio (NR) physical broadcast channels (NR-PBCHs) with NR synchronization signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-Advanced (LTE-A) network, a set of one or more base stations may define an eNodeB (eNB). In other examples (e.g., in a next generation or $5^{th}$ generation (5G) network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a wireless node. The method generally includes determining a frequency offset to use in transmitting one or more synchronization signals and one or more physical broadcast channels (PBCHs) and transmitting the one or more synchronization signals, using a synchronization signal (SS) transmission band having an SS center frequency, and the one or more PBCHs, using a PBCH transmission band having a PBCH center frequency that differs from the SS center frequency by the determined frequency offset.

Certain aspects provide a method for wireless communications by a wireless node. The method generally includes determining a frequency offset and processing one or more synchronization signals (SS) and one or more physical broadcast channels (PBCHs) based on an SS transmission band having an SS center frequency and a PBCH transmission band having a PBCH center frequency that differs from the SS center frequency by the determined frequency offset.

Certain aspects provide an apparatus for wireless communications. The apparatus generally includes a processor configured to determine a frequency offset for a wireless node to use in transmitting one or more synchronization signals and one or more physical broadcast channels (PBCHs) and to cause the wireless node to transmit the one or more synchronization signals, using a synchronization signal (SS) transmission band having an SS center frequency, and the one or more PBCHs, using a PBCH transmission band having a PBCH center frequency that differs from the SS center frequency by the determined frequency offset, and a memory coupled with the processor.

Certain aspects provide an apparatus for wireless communications. The apparatus generally includes a processor configured to determine a frequency offset and to process one or more synchronization signals (SS) and one or more physical broadcast channels (PBCHs) based on an SS transmission band having an SS center frequency and a PBCH transmission band having a PBCH center frequency that differs from the SS center frequency by the determined frequency offset, and a memory coupled with the processor.

Certain aspects provide an apparatus for wireless communications. The apparatus generally includes means for determining a frequency offset for the apparatus to use in transmitting one or more synchronization signals and one or more physical broadcast channels (PBCHs) and means for transmitting the one or more synchronization signals, using a synchronization signal (SS) transmission band having an SS center frequency, and the one or more PBCHs, using a PBCH transmission band having a PBCH center frequency that differs from the SS center frequency by the determined frequency offset.

Certain aspects provide an apparatus for wireless communications. The apparatus generally includes means for determining a frequency offset and means for processing one or more synchronization signals (SS) and one or more physical broadcast channels (PBCHs) based on an SS transmission band having an SS center frequency and a PBCH transmission band having a PBCH center frequency that differs from the SS center frequency by the determined frequency offset.

Certain aspects provide a computer-readable media including code for wireless communications. The code, when executed by a processor, causes the processor to perform operations generally including determining a frequency offset to use in transmitting one or more synchronization signals and one or more physical broadcast channels (PBCHs) and transmitting the one or more synchronization signals, using a synchronization signal (SS) transmission band having an SS center frequency, and the one or more PBCHs, using a PBCH transmission band having a PBCH center frequency that differs from the SS center frequency by the determined frequency offset.

Certain aspects provide a computer-readable media including code for wireless communications. The code, when executed by a processor, causes the processor to perform operations generally including determining a frequency offset and processing one or more synchronization signals (SS) and one or more physical broadcast channels (PBCHs) based on an SS transmission band having an SS center frequency and a PBCH transmission band having a PBCH center frequency that differs from the SS center frequency by the determined frequency offset.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
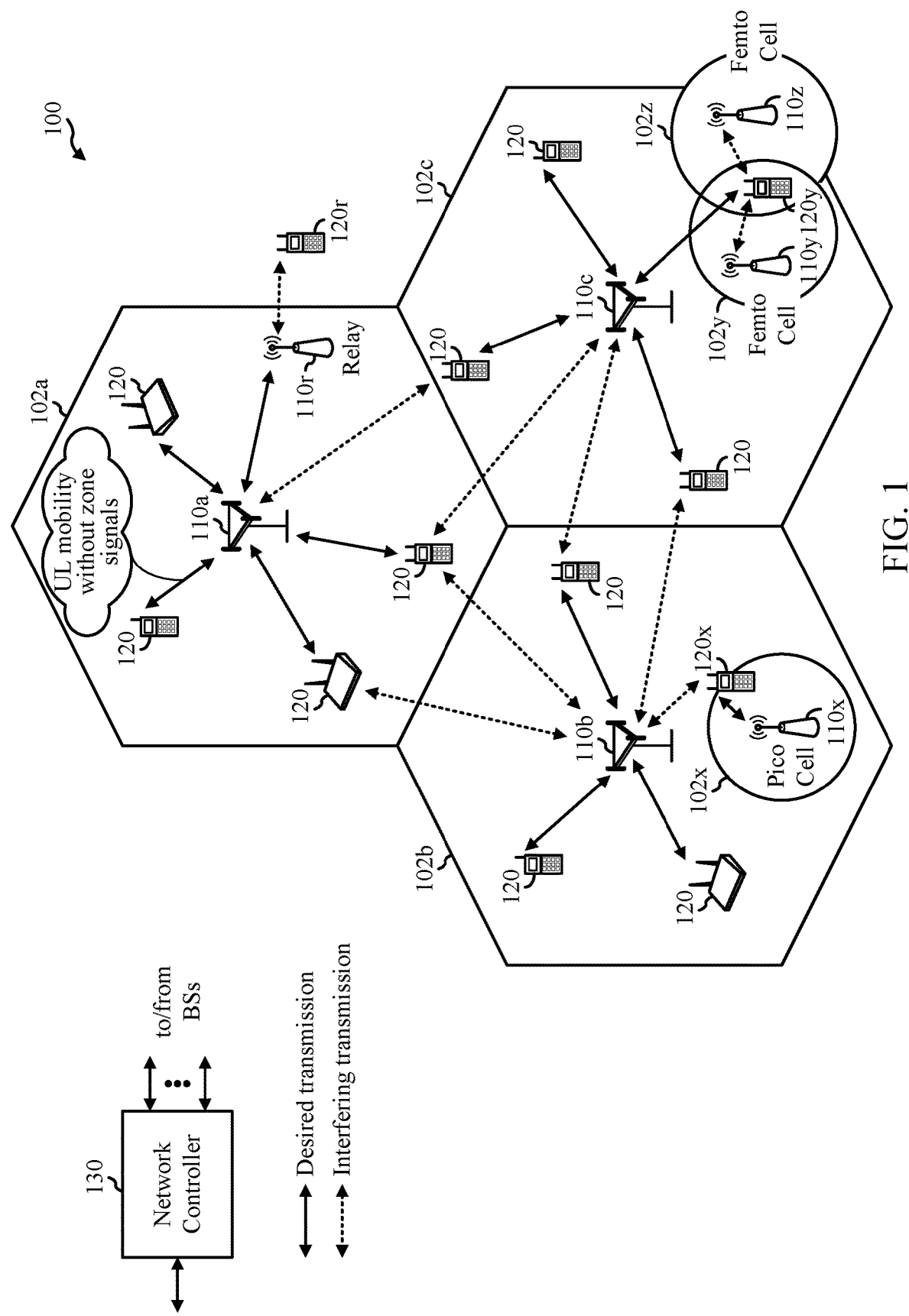
FIG. 1 is a block diagram conceptually illustrating an example telecommunications system, in accordance with certain aspects of the present disclosure.

Aspects of the present disclosure relate to methods and apparatus for multiplexing new radio (NR) physical broadcast channels (NR-PBCHs) with NR synchronization signals (SS).

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g., 80 MHz and larger), millimeter wave (mmW) targeting high carrier frequency (e.g., 27 GHz and higher), massive machine-type communications (mMTC) targeting non-backward compatible machine-type communications (MTC) techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OF-DMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A base station (BS) may be a station that communicates with user equipments (UEs). Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth (e.g., system frequency band) into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks (RBs)), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
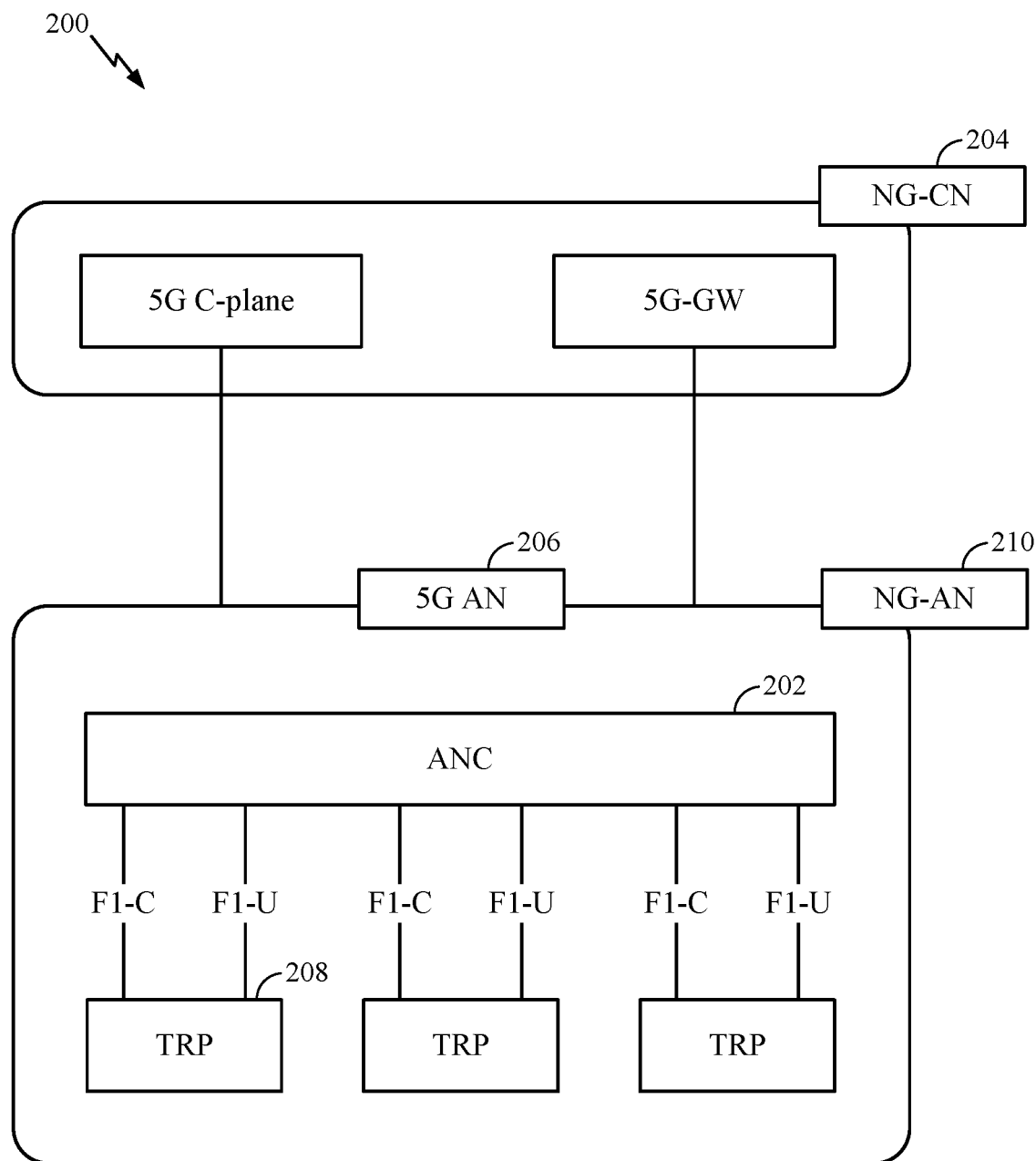
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed or present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
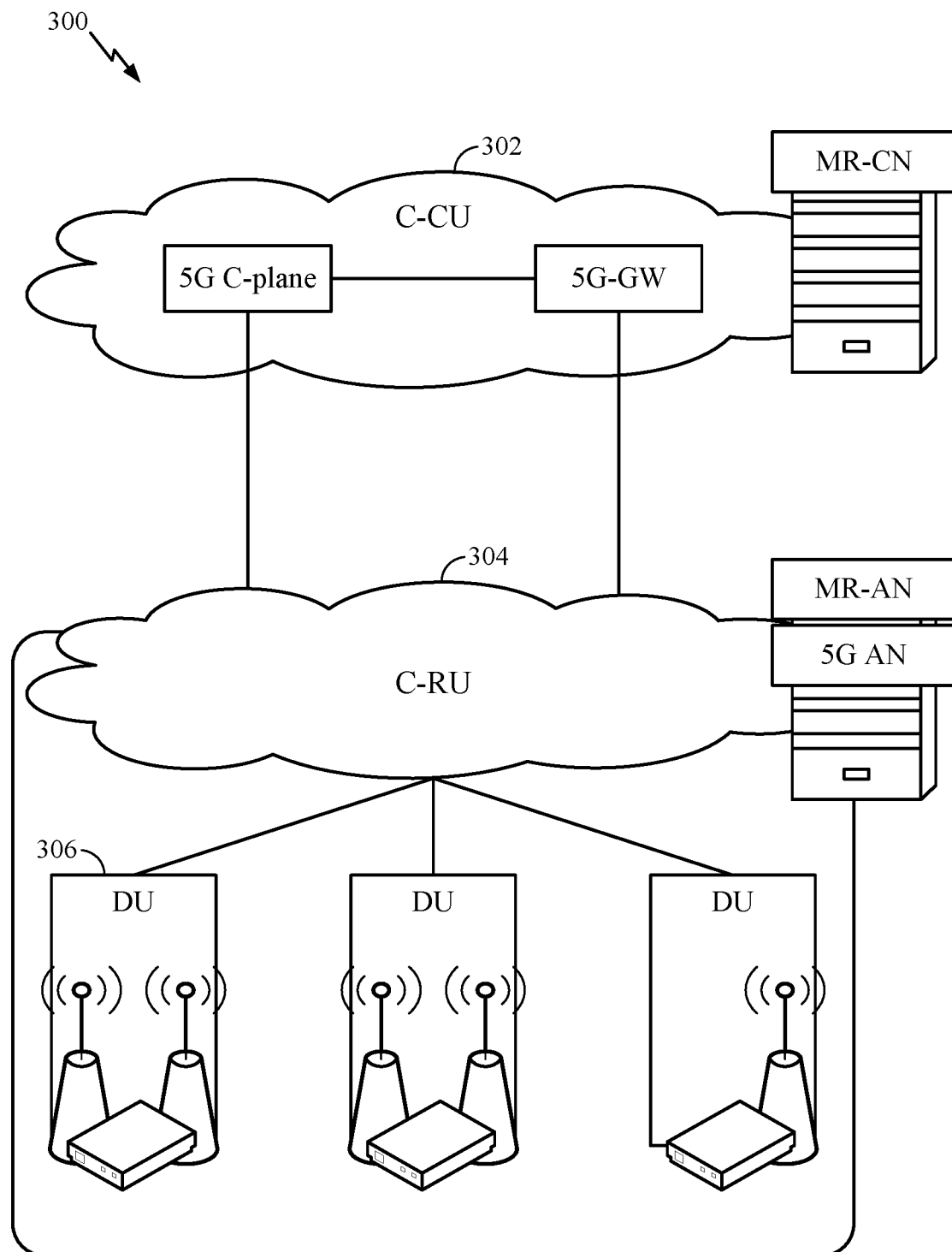
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
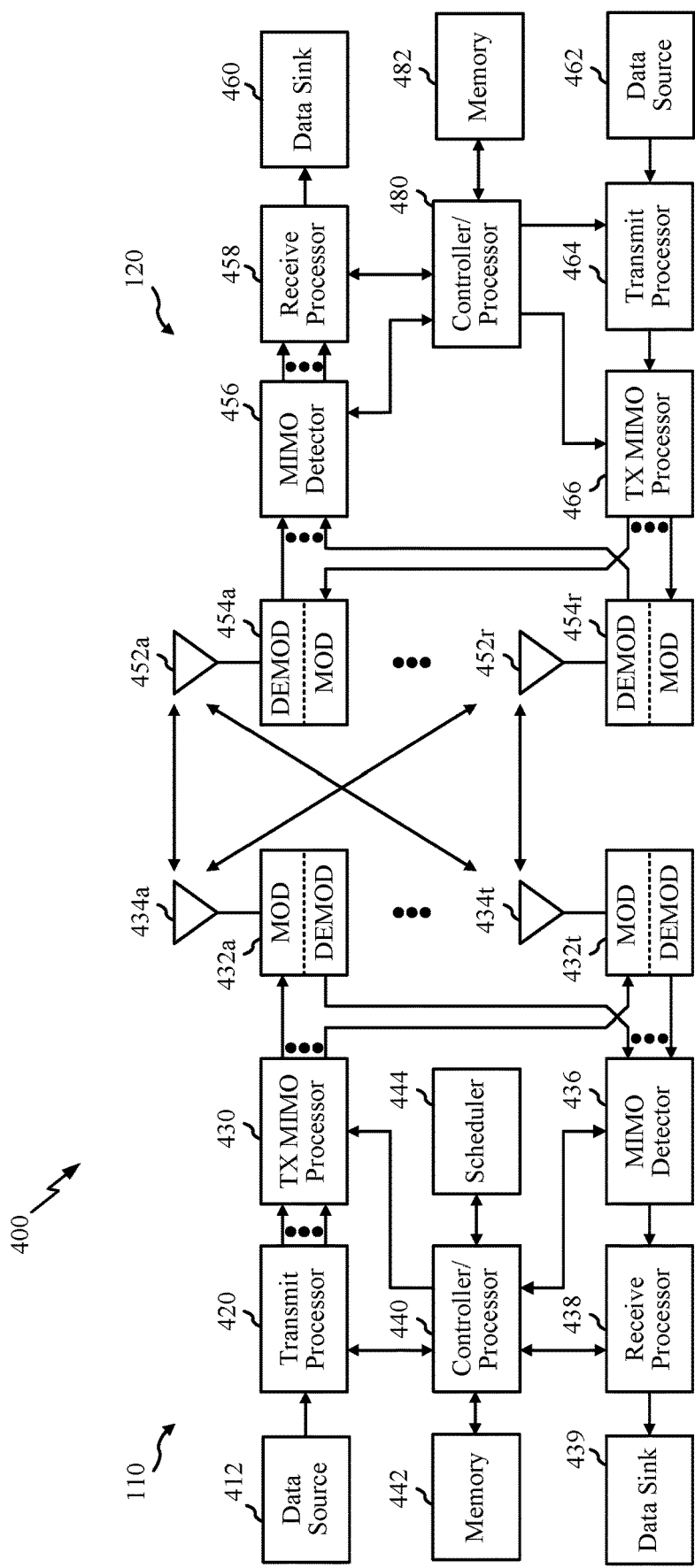
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 8-11.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE- MODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processing can be done in the central unit, while other processing can be done at the distributed units. For example, in accordance with one or more aspects as shown in the diagram, the BS modulator/demodulator 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIGS. 8-11, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
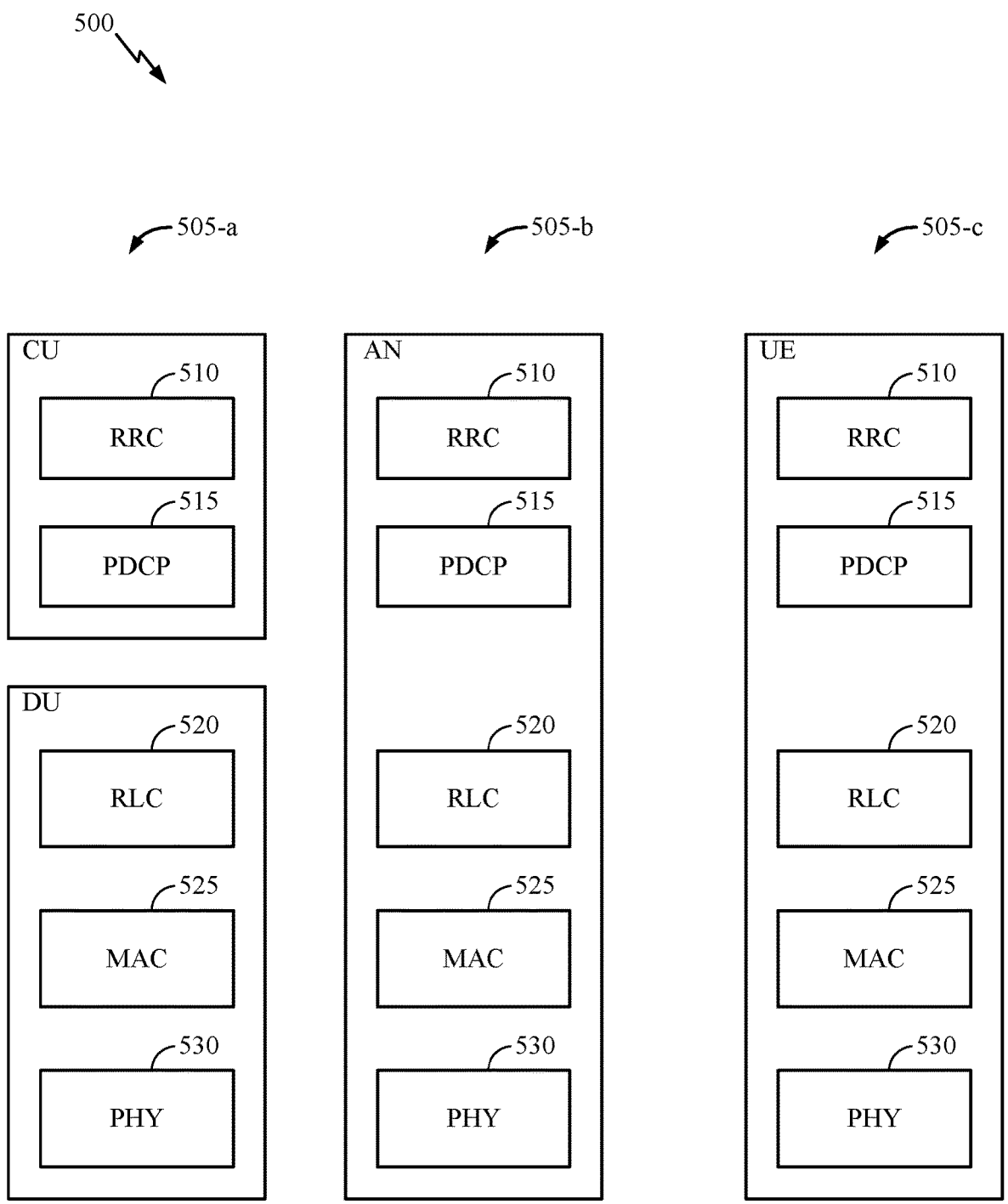
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack 505-*c* (e.g., the RRC layer 510, the PDCP layer 515, the RLC layer 520, the MAC layer 525, and the PHY layer 530).

Figure 6:
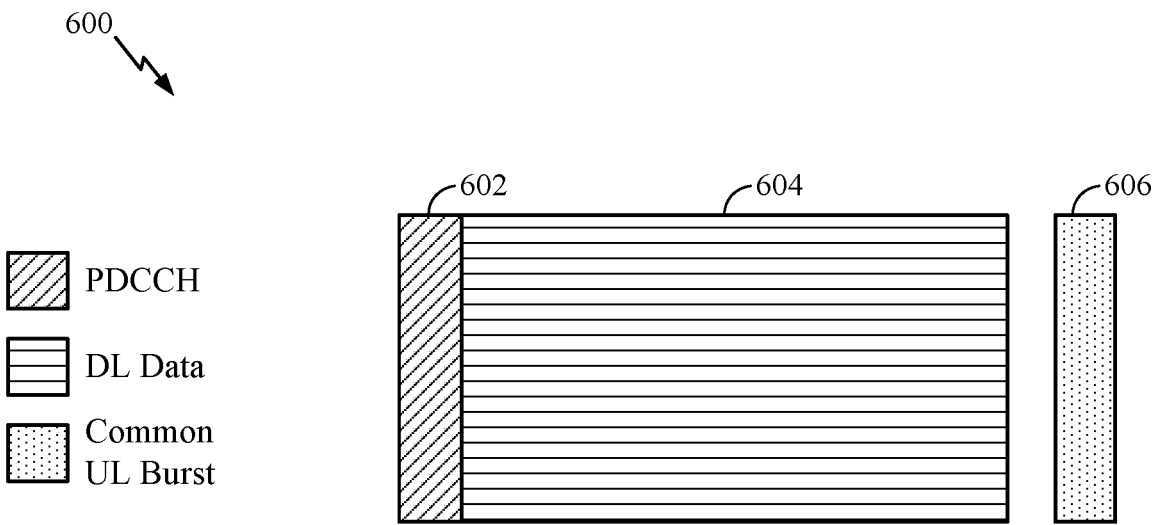
FIG. 6 illustrates an example of a downlink-centric (DL-centric) subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
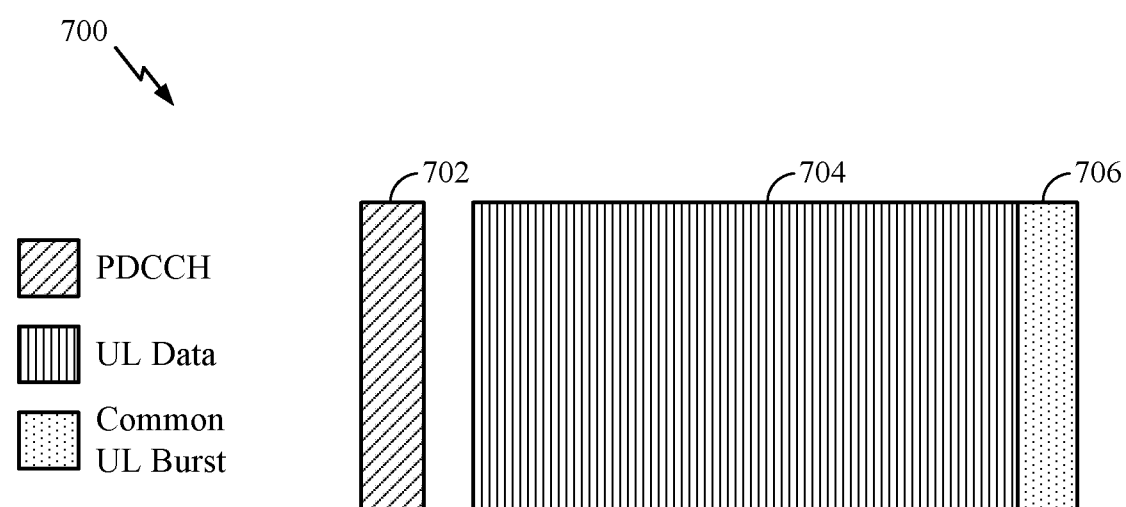
FIG. 7 illustrates an example of an uplink-centric (UL-centric) subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Multiplexing Broadcast Channels with Synchronization Signals in New Radio Under 3GPP's 5G wireless communication standards, a structure has been defined for NR synchronization (synch) signals (NR-SS), also referred to as NR synchronization channels. Under 5G, a set of consecutive OFDM symbols carrying different types of synch signals (e.g., primary synchronization signal (PSS), secondary synchronization signal (SSS), time synchronization signal (TSS), PBCH) forms an SS block. In some cases, a set of one or more SS blocks may form an SS burst. In addition, different SS blocks may be transmitted on different beams to achieve beam-sweeping for synch signals, which may be used by a UE to quickly identify and acquire a cell. Further, one or more of the channels in an SS block may be used for measurements. Such measurements may be used for various purposes such as radio link management (RLM), beam management, etc. For example, a UE may measure the cell quality and report the quality back in the form of a measurement report, which may be used by the base station for beam management and other purposes.

Figure 8:
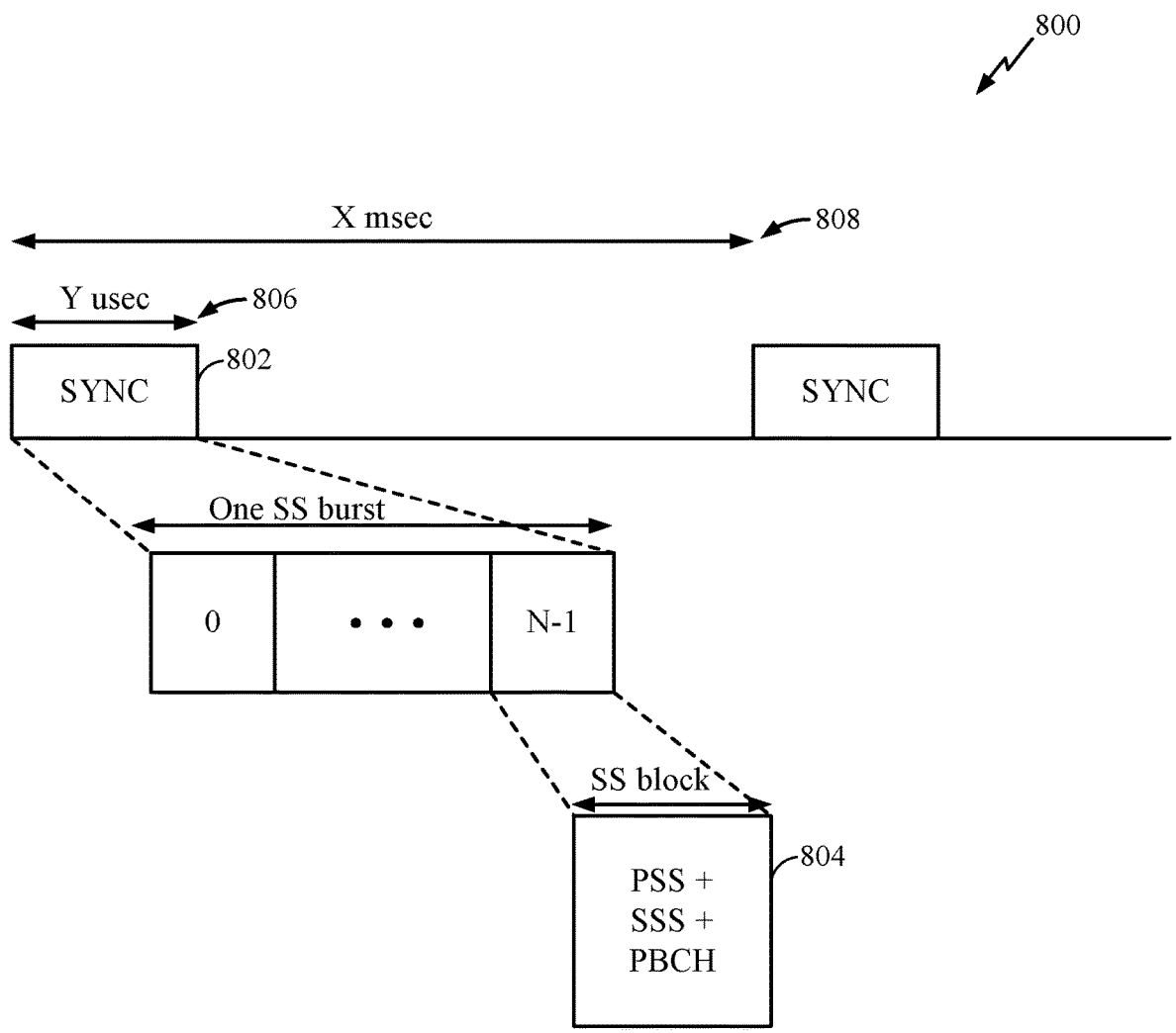
FIG. 8 illustrates an example transmission timeline, in accordance with certain aspects of the present disclosure.

FIG. 8 illustrates an example transmission timeline 800 of synchronization signals for a new radio telecommunications system, in accordance with aspects of the present disclosure. A BS, such as BS 110 shown in FIG. 1, may transmit an SS burst 802 during a period 806 of Y psec, in accordance with certain aspects of the present disclosure. Operations 800 begin, at 802, by transmitting a synchronization signal (SS) burst. The SS burst may include N SS blocks 804 with indices of zero to N–1, and the BS may transmit different SS blocks of the burst using different transmit beams (e.g., for beam-sweeping). Each SS block may include, for example, a primary synchronization signal (PSS), a secondary synchronization signal (SSS), and one or more physical broadcast channels (PBCHs), also referred to as synchronization channels. The BS may transmit SS bursts on a periodic basis, with a period 808 of X msec.

Figure 9:
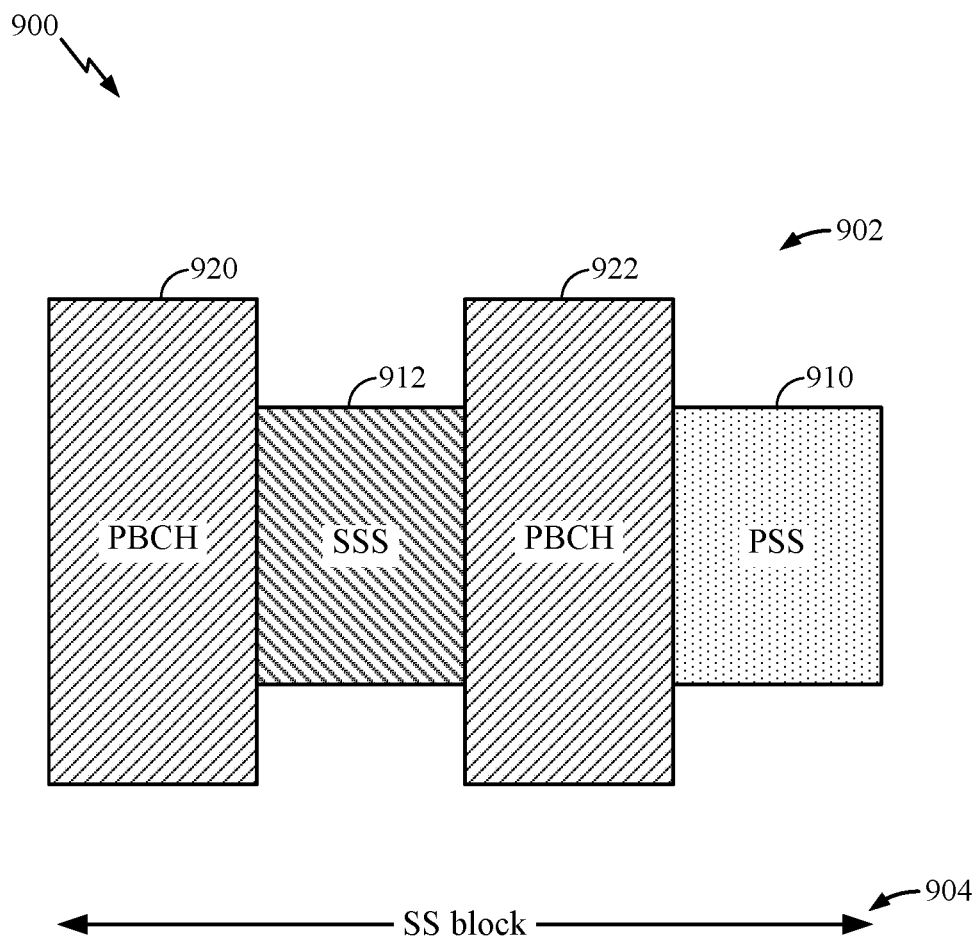
FIG. 9 illustrates an example resource mapping, in accordance with certain aspects of the present disclosure.

FIG. 9 illustrates an example resource mapping 900 for an exemplary SS block 902, in accordance with aspects of the present disclosure. The exemplary SS block may be transmitted by a BS, such as BS 110 in FIG. 1, over a period 904 (e.g., Y psec, as shown in FIG. 8). The exemplary SS block includes a PSS 910, an SSS 912, and two PBCHs 920 and 922, although the disclosure is not so limited, and an SS block may include more or fewer synchronization signals and synchronization channels. As illustrated, a transmission bandwidth (B1) of the PBCHs may be different from a transmission bandwidth (B2) of the synchronization signals. For example, the transmission bandwidth of the PBCHs may be 288 tones, while the transmission bandwidth of the PSS and SSS may be 127 tones.

According to aspects of the present disclosure, a frequency location of synchronization channels (e.g., PBCHs) may be determined relative to a frequency location of synchronization signals. As a transmission bandwidth for transmitting PBCHs may be larger than a transmission bandwidth transmitting synchronization signals (e.g., SSS), there are different options for the relative locations of PBCH and synchronization signals (e.g., SSS, PSS) in the frequency domain.

In aspects of the present disclosure, a center frequency for transmission of PBCH may be aligned with a center frequency for transmission of PSS and/or SSS. When the center frequencies are aligned, then it may be desirable to place the common center frequency on one of the frequency rasters of a frequency band.

Figure 10A:
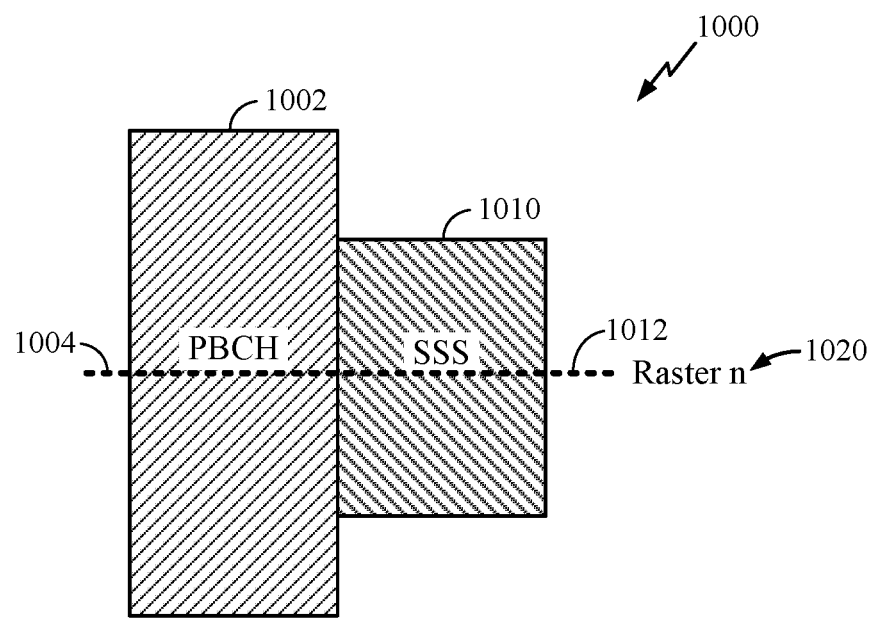
FIGS. 10A & 10B illustrate example transmission resource mappings, in accordance with certain aspects of the present disclosure.

FIG. 10A illustrates an exemplary transmission resource mapping 1000 of a PBCH 1002 and a SSS 1010. As illustrated, a center frequency 1004 of the PBCH and a center frequency 1012 of the SSS are on a frequency raster 1020 of a frequency band (not shown).

According to aspects of the present disclosure, there may an offset between a center frequency for transmission of PBCH and a center frequency for transmission of PSS and/or SSS. When the center frequencies are not aligned, it may be desirable to align the center frequency for transmission of PSS and/or SSS with one of the frequency rasters, while this may not be the case for the center frequency for transmission of PBCH.

Figure 10B:
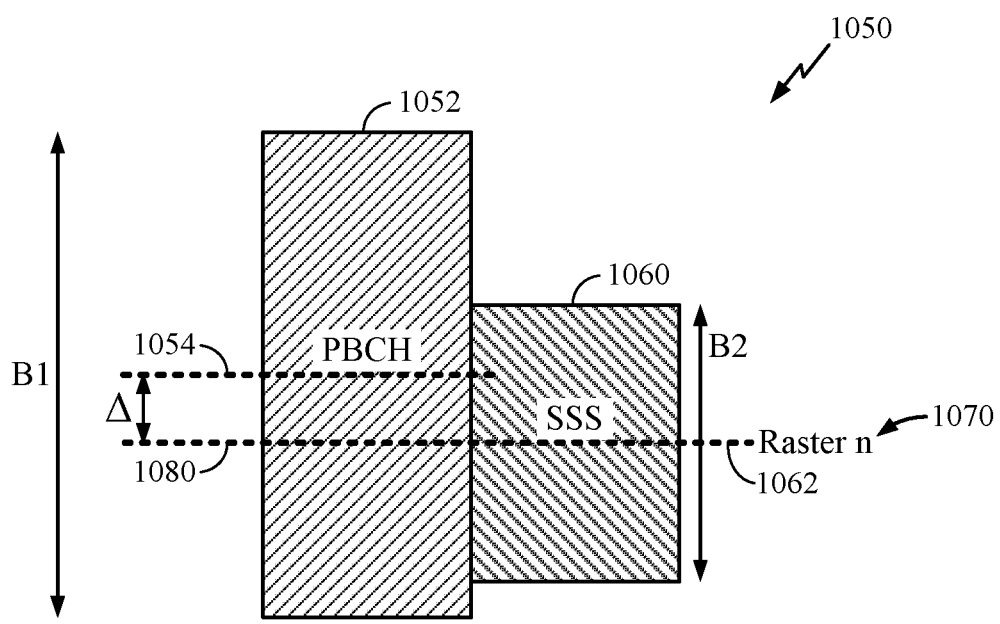

FIG. 10B illustrates an exemplary transmission resource mapping 1050 of a PBCH 1052 and a SSS 1060. As illustrated, there is a frequency offset 1080 (Δ) between a center frequency 1054 of the PBCH and a center frequency 1062 of the SSS, which is on a frequency raster 1070 of a frequency band (not shown).

Figure 11:
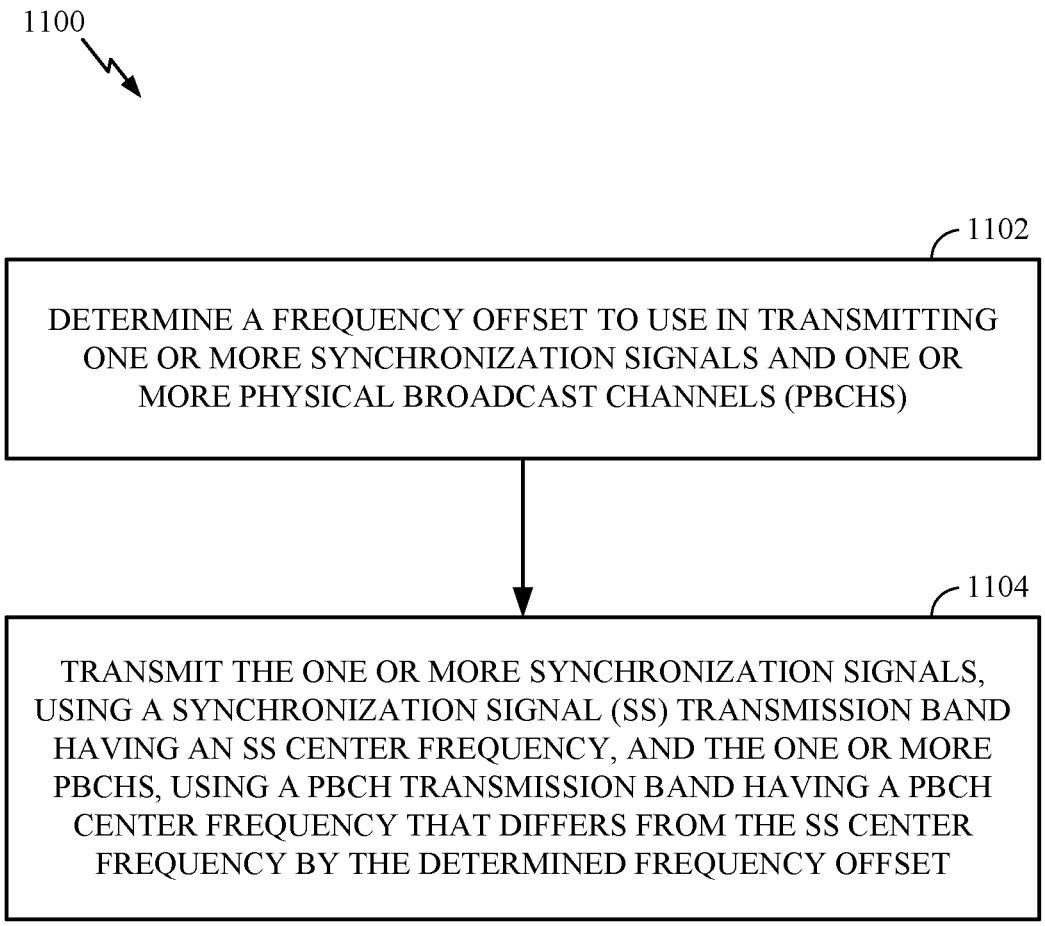
FIG. 11 illustrates example operations for wireless communications by a base station (BS), in accordance with certain aspects of the present disclosure.

FIG. 11 illustrates example operations for wireless communications by a wireless node, such as BS 110 shown in FIG. 1, in accordance with aspects of the present disclosure. Operations 1100 begin, at 1102, by the wireless node determining a frequency offset to use in transmitting one or more synchronization signals and one or more physical broadcast channels (PBCHs). At 1104, operations 1100 continue by the wireless node transmitting the one or more synchronization signals, using a synchronization signal (SS) transmission band having an SS center frequency, and the one or more PBCHs, using a PBCH transmission band having a PBCH center frequency that differs from the SS center frequency by the determined frequency offset.

Figure 12:
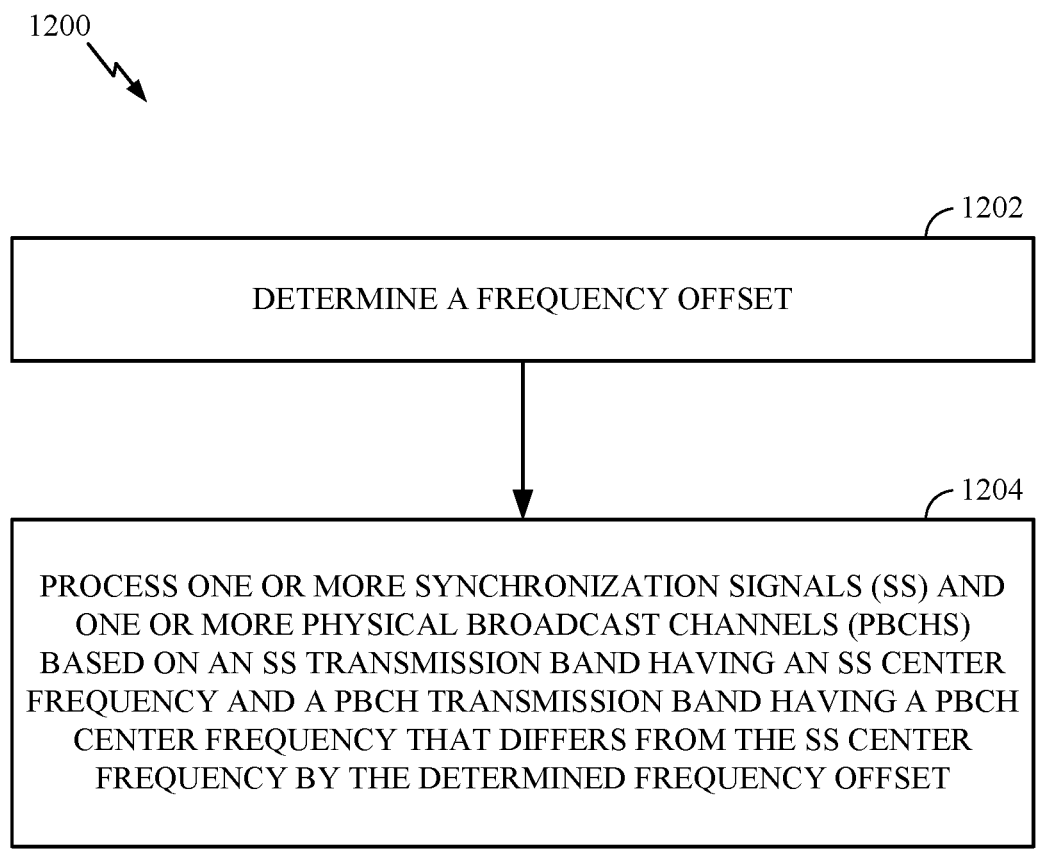
FIG. 12 illustrates example operations for wireless communications by a user equipment (UE), in accordance with certain aspects of the present disclosure.

FIG. 12 illustrates example operations for wireless communications by a wireless node, such as UE 120 shown in FIG. 1, in accordance with aspects of the present disclosure. Operations 1200 begin, at 1202, by the wireless node determining a frequency offset. At 1204, operations 1200 continue by the wireless node processing one or more synchronization signals (SS) and one or more physical broadcast channels (PBCHs) based on an SS transmission band having an SS center frequency and a PBCH transmission band having a PBCH center frequency that differs from the SS center frequency by the determined frequency offset.

According to aspects of the present disclosure and as discussed above, there may an offset between a center frequency for transmission of PBCH and a center frequency for transmission of PSS and/or SSS. When there is an offset, the offset may be determined or selected (e.g. by a BS) such that a transmission band for transmitting PBCH is aligned with a transmission band for transmitting PSS and/or SSS at one edge frequency.

In aspects of the present disclosure, bottom edges of the transmission band for PBCH and the transmission band for synchronization signals (e.g., PSS, SSS) may be aligned. In this case, the offset Δ may be determined mathematically as:

$$\Delta = \frac{B1 - B2}{2}$$

Figure 13A:
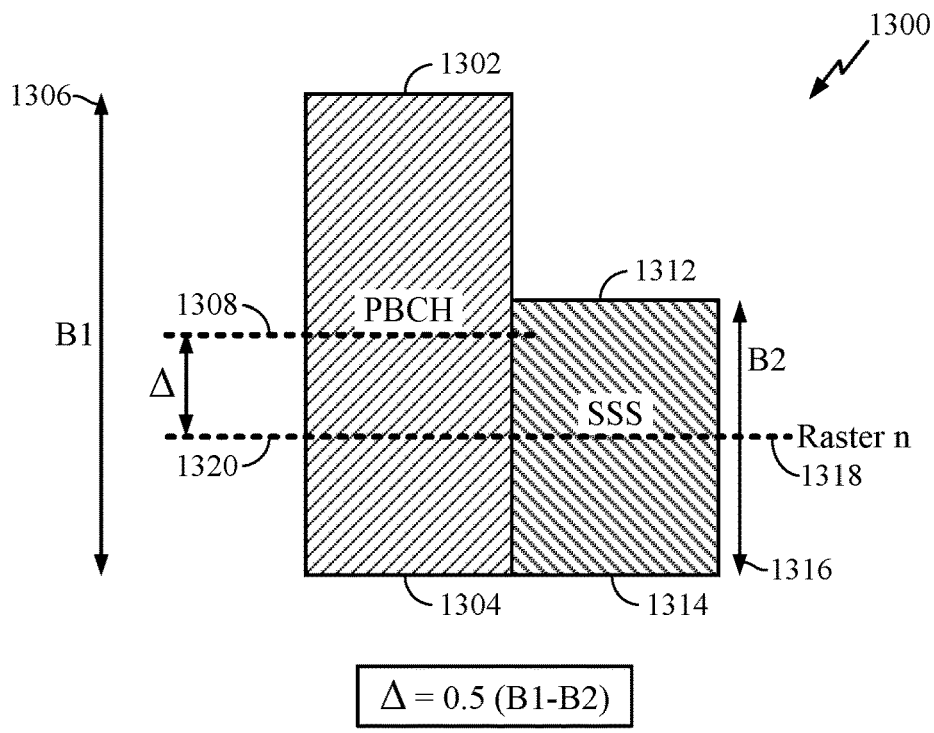
FIGS. 13A & 13B illustrate example transmission resource mappings, in accordance with certain aspects of the present disclosure.

FIG. 13A illustrates an exemplary transmission resource mapping 1300 for transmitting synchronization signals (SS) and PBCHs, in accordance with aspects of the present disclosure. As illustrated, a bottom edge 1304 of a transmission band 1306 (B1) for a PBCH 1302 is aligned with a bottom edge 1314 of a transmission band 1316 (B2) for a SSS 1312. The offset 1320 (Δ) may be calculated according to the formula mentioned above, and then a center frequency 1308 of the transmission band 1306 for the PBCH may be determined based on a center frequency 1318 of the SSS and the offset 1320.

According to aspects of the present disclosure, top edges of the transmission band for PBCH and the transmission band for SS (e.g., PSS, SSS) may be aligned. In this case, the offset Δ may be determined mathematically as:

$$\Delta = -\frac{B1 - B2}{2}$$

Figure 13B:
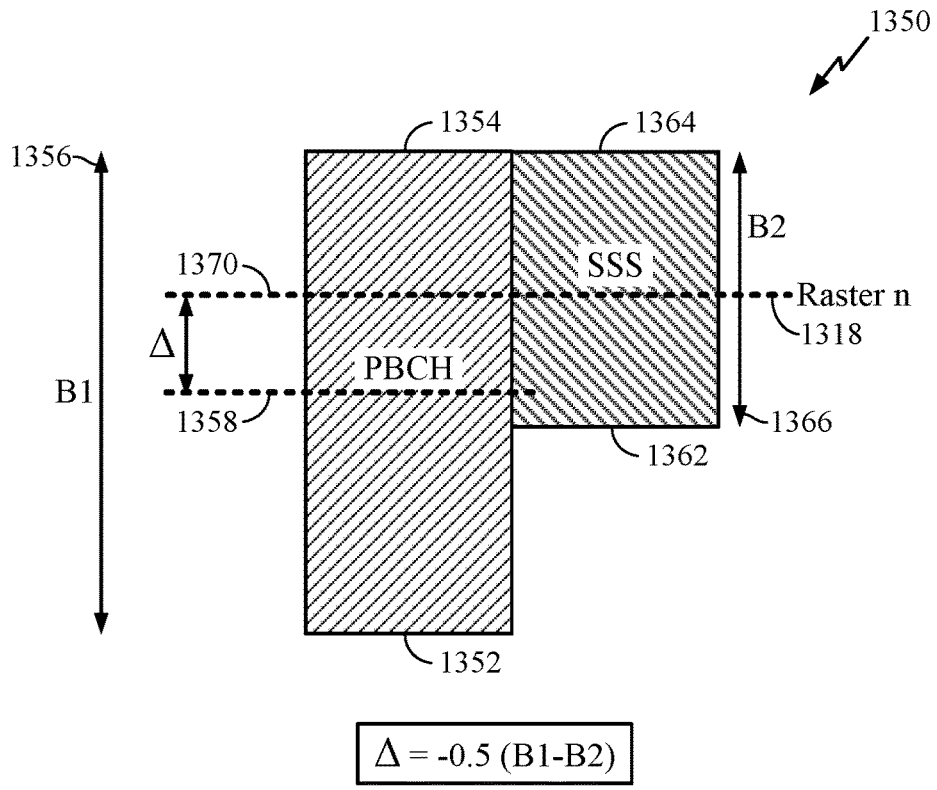

FIG. 13B illustrates an exemplary transmission resource mapping 1350 for transmitting SS and PBCHs, in accordance with aspects of the present disclosure. As illustrated, a top edge 1354 of a transmission band 1356 (B1) for a PBCH 1352 is aligned with a top edge 1364 of a transmission band 1366 (B2) for a SSS 1362. The offset 1370 (Δ) may be calculated according to the formula mentioned above, and then a center frequency 1358 of the transmission band 1356 for the PBCH may be determined based on a center frequency 1368 of the SSS and the offset 1370.

According to aspects of the present disclosure, a value of a frequency offset Δ may be determined based on the location (i.e., frequency) of the frequency raster.

In aspects of the present disclosure, a value of a frequency offset Δ may be determined based on the frequency band.

According to aspects of the present disclosure, a value of a frequency offset Δ may be fixed for all rasters within a frequency band (e.g., a frequency band used by a communications system).

In aspects of the present disclosure, a value of a frequency offset Δ may be determined (e.g., by an upper layer of a protocol stack) and signaled by upper layer signaling.

According to aspects of the present disclosure, a value of a frequency offset Δ may be determined based on a configuration of a transmitting device (e.g., a BS). The configuration may, for example, configure the offset to be fixed.

In aspects of the present disclosure, a configuration of a device may indicate that a value of a frequency offset Δ may change over time. The changing of the frequency offset may be in a semi-persistent manner (e.g., the value of the offset may be changed by the device in response to network conditions) or according to a periodic pattern (e.g., the offset varies with a SS block index or with an SS burst index).

According to aspects of the present disclosure, a value of a frequency offset Δ may change if indicated by an upper layer of a protocol stack.

In aspects of the present disclosure, a value of a frequency offset may be selected from a plurality (e.g., a set) of possible values.

According to aspects of the present disclosure, a plurality of values of frequency offsets may be determined (e.g., by a BS, by a UE) based on an operating mode of a device (e.g., a BS, a UE). An operating mode of a device may include, for example, transmitting SS and PBCHs as part of an initial acquisition procedure in a standalone communications system (e.g., a NR system that is not interworking with an LTE system). Additionally or alternatively, an operating mode of a device may include, for example, transmitting SS and PBCHs as part of an initial acquisition procedure in a non-standalone communications system (e.g., a NR system that is interworking with an LTE system).

In aspects of the present disclosure, an operating mode of a device may include transmitting SS and PBCHs to one or more UEs in a radio resource control (RRC) idle (RRC-idle) mode.

According to aspects of the present disclosure, an operating mode of a device may include transmitting SS and PBCHs to one or more UEs in a radio resource control (RRC) connected (RRC-connected) mode.

Figure 14:
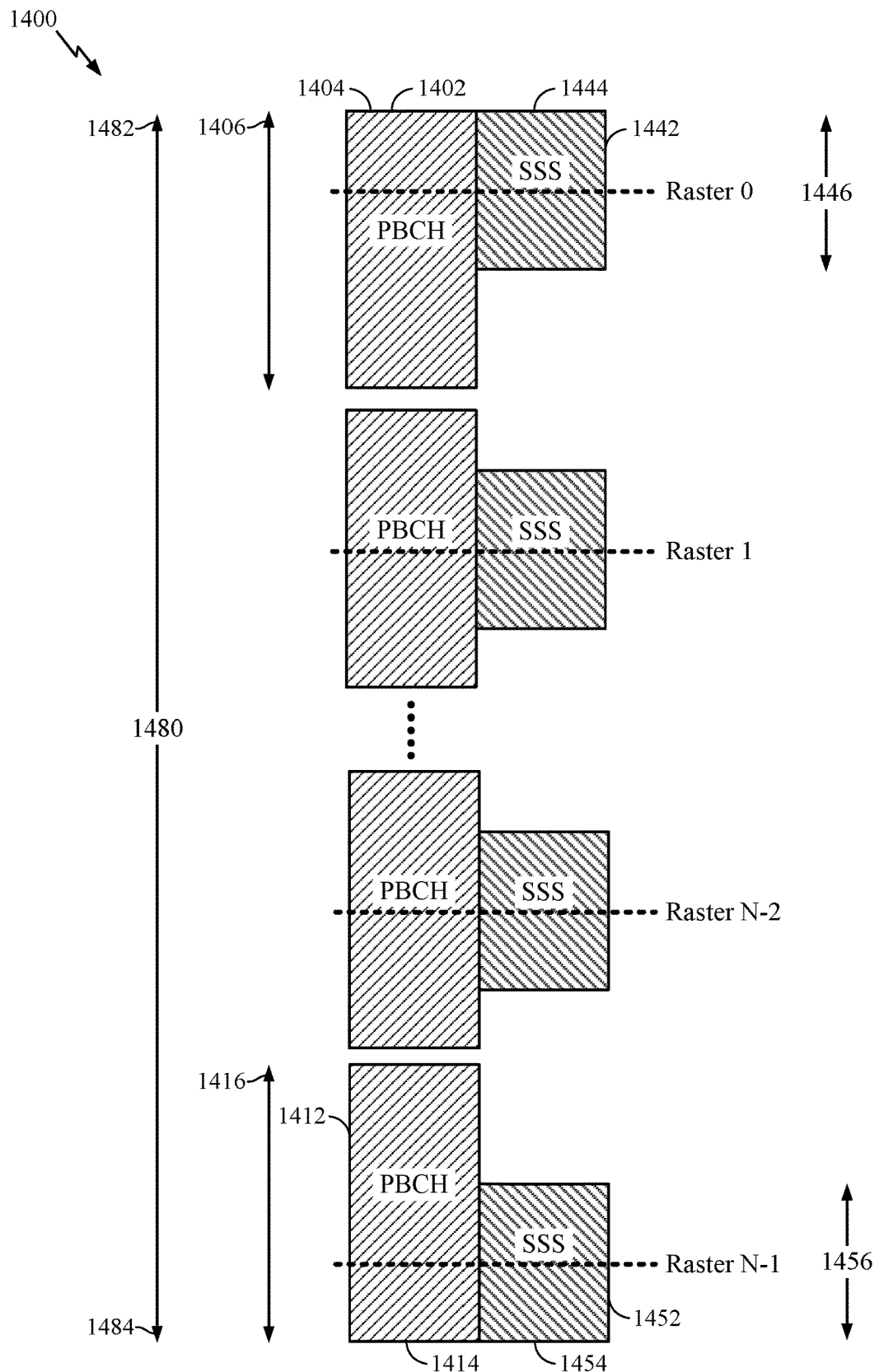
FIG. 14 illustrates an exemplary transmission resource mapping, in accordance with aspects of the present disclosure.

FIG. 14 illustrates an exemplary transmission resource mapping 1400 for transmitting SS and PBCHs, in accordance with aspects of the present disclosure. As illustrated, a top edge (e.g., upper frequency edge) 1404 of a transmission band 1406 for a PBCH 1402, which is at a top end 1482 of a system frequency band 1480, is aligned with a top edge (e.g., upper frequency edge) 1444 of a transmission band 1446 for a SSS 1442, which is at the top end (e.g., upper frequency edge) of the system frequency band. Similarly, a bottom edge (e.g., lower frequency edge) 1414 of a transmission band 1416 for a PBCH 1412, which is at a bottom end 1484 of the system frequency band, is aligned with a bottom edge (e.g., lower frequency edge) 1454 of a transmission band 1456 for a SSS 1452, which is at the bottom end (e.g., lower frequency edge) of the system frequency band. Offsets, Δ, for the top end (e.g., upper frequency edge) and bottom end PBCHs and SSS may be calculated according to formulas mentioned above, and other offsets may be calculated for the other SS and PBCH transmission bands. As illustrated, offsets for SS and PBCH transmission bands that are not at the top end (e.g., upper frequency edge) or bottom end (e.g., lower frequency edge) of the system frequency band may be zero.

According to aspects of the present disclosure, a value of an offset may be indicated by any combination of the sync signals (e.g., PSS, SSS) and/or a demodulation reference signal (DMRS) of a PBCH.

In aspects of the present disclosure, a value of an offset may be indicated by a configuration of the device, if the value is not fixed over time.

According aspects of the present disclosure, a value of an offset may be indicated in a master information block (MIB), in a system information block (SIB), or via RRC signaling.

In aspects of the present disclosure, a value of an offset may be indicated by a pattern that may be preconfigured on a device.

According to aspects of the present disclosure, an indication of a value of an offset may comprise information about a pattern used in determining the offset (e.g., an index of a pattern in a set of possible patterns).

In aspects of the present disclosure, an indication of a value of an offset may comprise information indicating any change in the pattern or state.

According to aspects of the present disclosure, a UE may determine an offset used in transmitting PBCHs and SS by blind detection.

In aspects of the present disclosure, a UE may determine an offset used in transmitting PBCHs and SS based on the synchronization signals or other SS.

According to aspects of the present disclosure, a UE may determine an offset used in transmitting PBCHs and SS, after acquiring the transmitting cell or for a non-initial synchronization, via any of the previously mentioned techniques.

In aspects of the present disclosure, a value of an offset may indicate some information, e.g., information regarding an SS block timing index.

According to aspects of the present disclosure, a value of an offset may indicate a PBCH redundancy version (RV).

In aspects of the present disclosure, a UE may determine information indicated by an offset value (e.g., SS block timing index, PBCH RV) by detecting the offset value.

According to aspects of the present disclosure, synchronization signals and PBCH center frequencies may be asymmetrical. That is, PSS and/or SSS may be symmetrically mapped around a first synchronization (sync) frequency, while PBCHs of an SS block or SS burst, which includes the PSS and/or SSS, may not be mapped symmetrically around the first sync frequency.

In aspects of the present disclosure, PBCH may not be symmetrically mapped around a sync frequency, but may instead be mapped with an alignment to one side (upper or lower) of PSS and/or SSS, as shown at the top end or bottom end in FIG. 14.

According to aspects of the present disclosure, demodulation reference signals (DMRS) (e.g., DMRS transmitted with a PBCH) within a PSS and/or SSS transmission band may be used for PSS and/or SSS detection and/or verification. For example, a UE detecting and processing DMRS transmitted with a PBCH may use DMRS transmitted within (e.g., that overlap) a PSS and/or SSS transmission band for detecting and/or verifying the PSS and/or SSS. In the example, the UE may process the DMRS and determine information (e.g., channel state) regarding the transmission band, and then use that information in detecting and/or verifying the PSS and/or SSS.

In aspects of the present disclosure, a DMRS may comprise two sequences (e.g., constant amplitude zero autocorrelation (CAZAC) sequences), which are scrambled by a physical cell identifier (PCI) (of the transmitting cell) that is signaled in a PSS and/or a SSS. The two scrambled sequences may be transmitted on different frequency resources in a frequency division multiplexed (FDM) manner.

According to aspects of the present disclosure, the two sequences of a DMRS (e.g., DMRS of a PBCH) may be selected (e.g., by a BS) to signal a frequency and/or frequency offset of a PSS and/or SSS. That is, a BS transmitting one or more PBCHs with one or more SS may select sequences of a DMRS transmitted with the PBCHs so as to indicate (e.g., to a UE processing the PBCHs) a frequency of a PSS and/or SSS. The sequences may directly indicate a center frequency of the SS and/or indicate a frequency offset from a center frequency of the PBCHs.

Figure 15A:
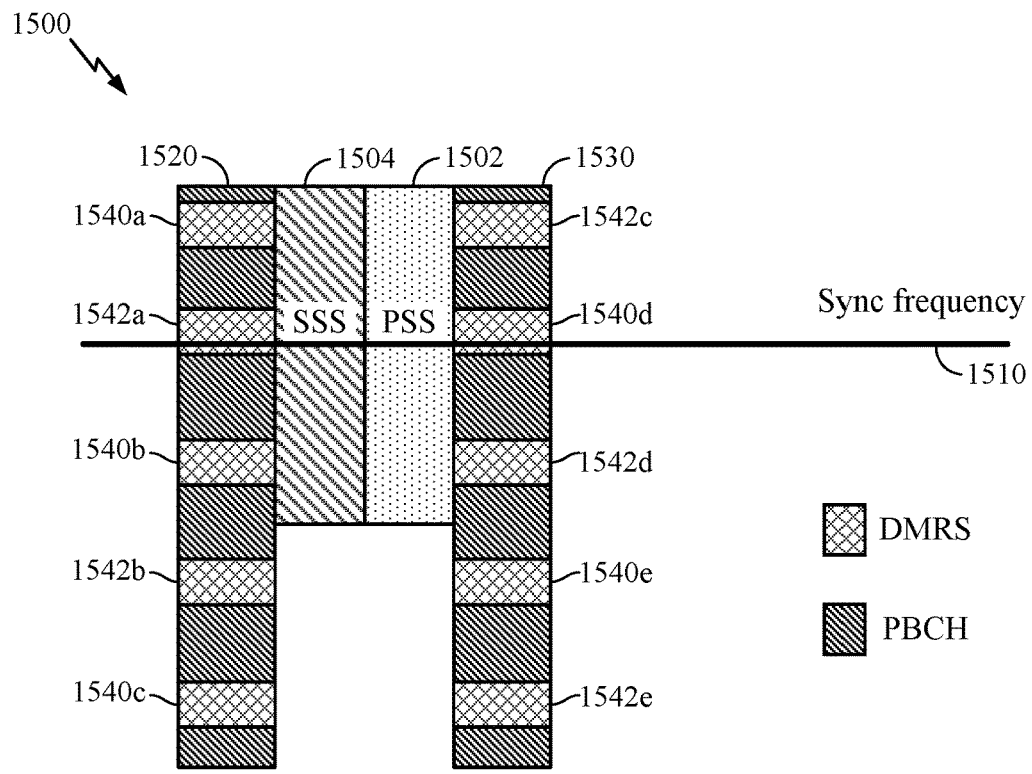
FIGS. 15A & 15B illustrate example transmission resource mappings, in accordance with certain aspects of the present disclosure.

FIG. 15A illustrates an exemplary transmission resource mapping 1500 for transmitting SS and PBCHs, in accordance with aspects of the present disclosure. As illustrated, a PSS 1502 and a SSS 1504 are mapped for transmission around a sync frequency 1510. As discussed above, in the exemplary transmission resource mapping, PBCHs 1520 and 1530 are mapped to frequency resources in a manner that is not symmetrical around the sync frequency. The PBCHs each include one or more DMRS. The DMRS comprise at least two sequences that are mapped to transmission resources at 1540 and 1542. As illustrated, the PBCHs are mapped to the frequency resources such that a top edge of a transmission band of each PBCH is aligned with a top edge of a transmission band of the SS.

As discussed above, the sequences of the DMRS in FIG. 15 may be selected to indicate information to a UE processing the PBCHs. For example, the sequences at 1540*a*, 1542*a*, 1540*b*, 1542*c*, 1540*d*, and 1542*d* (within or overlapping the PSS and SSS transmission bands) may be used by a UE processing the PBCHs to detect and/or verify the PSS and/or SSS.

According to aspects of the present disclosure, PBCHs may be symmetrically mapped around a second sync frequency around which a PSS and/or SSS is not mapped symmetrically.

In aspects of the present disclosure, the first and second sync frequencies may be consecutive rasters of a system frequency band. The second sync frequency may be above or below the first sync frequency.

According to aspects of the present disclosure, DMRS may indicate the second sync frequency. For example, sequences of one or more DMRS may be selected (e.g., by a transmitting BS) to indicate second sync frequencies.

Figure 15B:
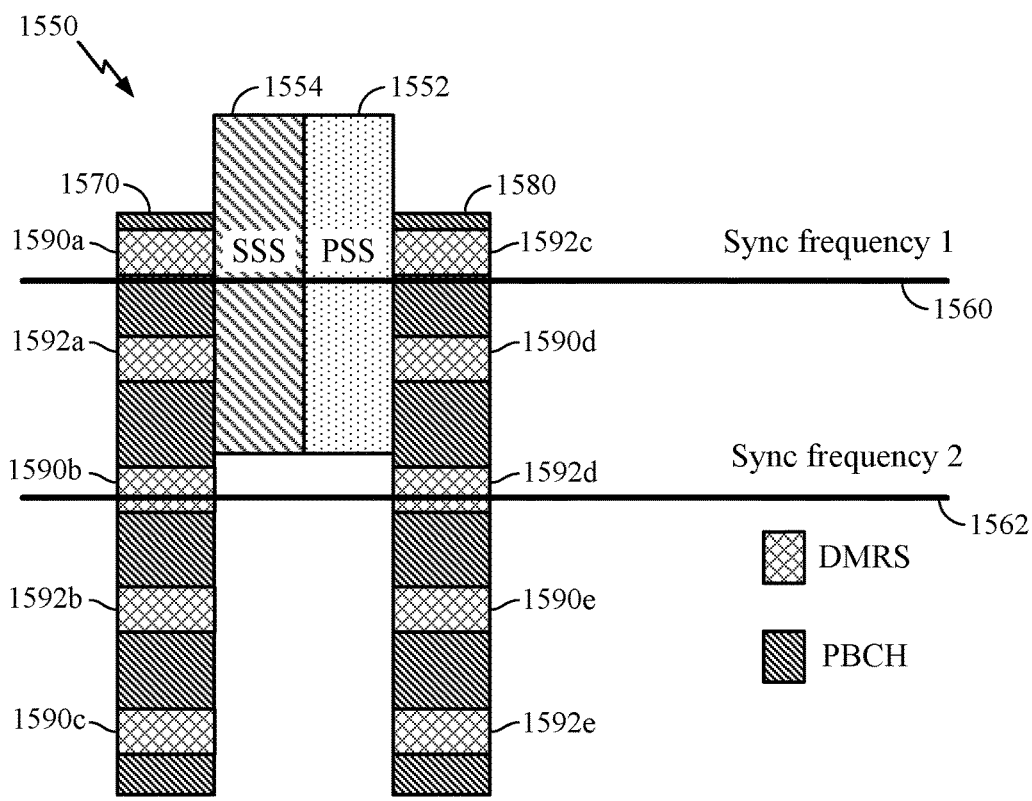

FIG. 15B illustrates an exemplary transmission resource mapping 1550 for transmitting SS and PBCHs, in accordance with aspects of the present disclosure. As illustrated, a PSS 1552 and a SSS 1554 are mapped for transmission around a first sync frequency 1560. As discussed above, in the exemplary transmission resource mapping, PBCHs 1570 and 1580 are mapped to frequency resources in a manner that is symmetrical around a second sync frequency 1562 but not symmetrical around the first sync frequency. The PBCHs each include one or more DMRS. The DMRS comprise at least two sequences that are mapped to transmission resources at 1590 and 1592.

As discussed above, the sequences of the DMRS in FIG. 15 may be selected to indicate information to a UE processing the PBCHs. For example, the sequences at 1590*a*, 1592*a*, 1592*c*, and 1590*d* (within the PSS and SSS transmission band) may be used by a UE processing the PBCHs to determine the second sync frequency.

According to aspects of the present disclosure, asymmetrical PSS, SSS, and/or PBCH multiplexing, as described above with reference to FIGS. 15A and 15B may enable a sparser sync raster than channel raster of a system frequency band. For example, for synchronization signals having a 30 kHz numerology (e.g., 30 kHz between subcarriers), a bandwidth used for transmitting PSS and/or SSS is 4.32 MHz. The SS bandwidth of 4.32 MHz implies that a communications system using the disclosed techniques may have sync raster of approximately 4.5 MHz, if used with a system having a minimum system bandwidth of 10 MHz.

In aspects of the present disclosure, the value of a frequency offset (e.g., from a center frequency) can be additionally or alternatively indicated thru: 1) the resource allocation of the sync signals and/or DMRS, for example, the relative location of two signals (e.g. PSS and SSS) in time domain, e.g., SS block can have two different designs: PSS-PBCH-SSS-PBCH or PBCH-SSS-PBCH-PSS, and different designs may be mapped to different values of a frequency offset; 2) The phase of one or more of the sync signals and/or DMRS, for example, the relative phase between SSS and other signal (e.g. PSS) can be {0, pi} to carry 1-bit information and the relative phase between (at least part of) DMRS signal and other signal (e.g. SSS) can carry information; 3) the RE mapping of a signal (one or more of SSS, DMRS, PSS) can carry this information, for example, a signal may be mapped to the REs within a bandwidth, starting from the lowest RB to the higher RB or in the reverse direction, or the RE mapping of a signal may follow a cyclic shift, where the amount of cyclic shift carries this information.

According to aspects of the present disclosure, the RE mapping of PBCH and its DMRS to the available tones can be such that the portion overlapping with PSS/SSS bandwidth remains the same irrespective of the offset value, and the rest of PBCH/DMRS, to be mapped to the REs not overlapping with PSS/SSS bandwidth, are mapped in a way to produce more orthogonality between signals corresponding to different offset values, as illustrated below with reference to FIG. 16.

In aspects of the present disclosure, the disclosed RE mapping of PBCH and DMRS may improve DMRS/PBCH processing to find the right offset value. The mapping may also allow processing (e.g., by a UE) of only the part of PBCH/DMRS within the PSS/SSS BW (irrespective of offset value). In many cases (e.g., good SNR), this may be sufficient to reliably detect DMRS and/or decode PBCH. The offset value can be acquired later after this processing is done.

Figure 16:
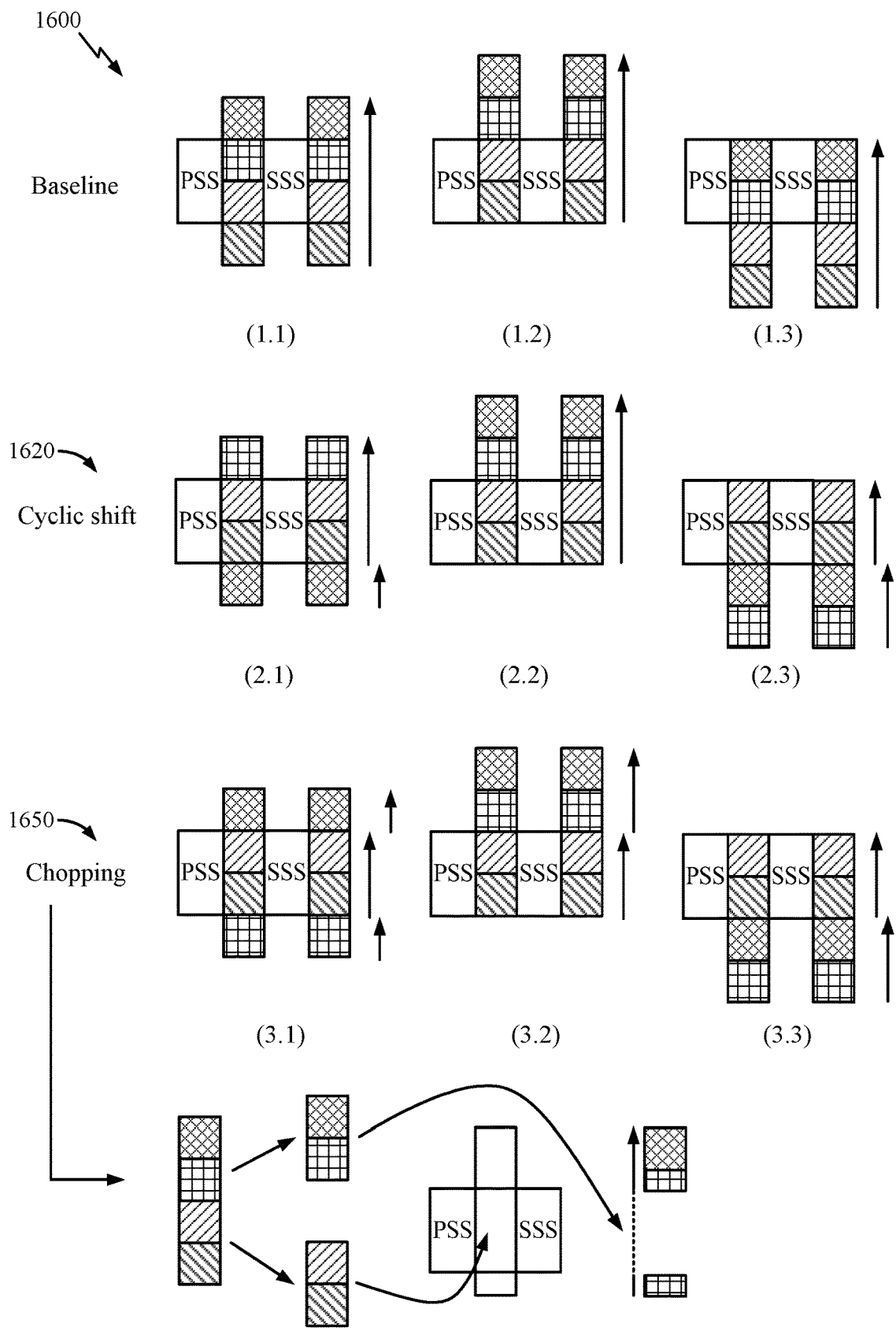
FIG. 16 illustrates examples of mapping of a physical broadcast channel (PBCH) to demodulation reference signals (DMRS), in accordance with aspects of the present disclosure.

FIG. 16 illustrates examples of mapping of PBCH/DMRS to REs, in accordance with aspects of the present disclosure. FIG. 16 illustrates a baseline mapping 1600 of PBCH/DMRS from the lowest (or highest) RB available within the PBCH TX BW to the highest (or lowest) RB. FIG. 16 also illustrates a cyclic shift mapping 1620, wherein the PBCH/DMRS mapping starts from the lowest (or highest) RB within the PSS/SSS BW towards the highest (lowest) RB within the PBCH TX BW, and wraps around when reaching the highest (lowest) RB. FIG. 16 illustrates a chopping mapping 1650, wherein the mapping starts the PBCH/DMRS from the lowest (or highest) RB within the PSS/SSS BW until hitting the highest (lowest) RB within the PSS/SSS BW, and the rest of PBCH/DMRS is mapped to the available RBs within PBCH BW and not overlapping with PSS/SSS BW—starting from lowest (highest) position and skipping the RBs within PSS/SSS BW. That is, the PBCH/DMRS is divided into two parts; one part is mapped to the RBs within PSS/SSS BW (in a way irrespective of offset value), and the other part is mapped to the RBs outside PSS/SSS BW based on the value of offset. While the above is discussed in terms of PSS/SSS BW, the present disclosure is not so limited and does not necessarily mean the exact REs occupied by PSS/SSS—for example, it may additionally include some extra REs (e.g. PSS/SSS occupy 127 REs, but here we may refer to 12 RBs (144 REs) within which PSS/SSS are transmitted).

According to aspects of the present disclosure, the value of offset for a first base station, BS1, for a given band or sync raster, can be indicated by another base station, BS2. For example, a serving cell can provide information about a neighbor cell, or by another BS2 at a different frequency or using a different RAT. For example, in LTE-NR coexistence or NR sub-6 GHz-above-6 GHz coexistence, where BS1 and BS2 may or may not be collocated.

In aspects of the present disclosure, the value of offset can be implicitly signaled. For example, a UE may assume the same PBCH/DMRS raster offset is used by a neighboring cell as the one used by the serving cell (e.g., at the same or a different frequency).

Figure 17A:
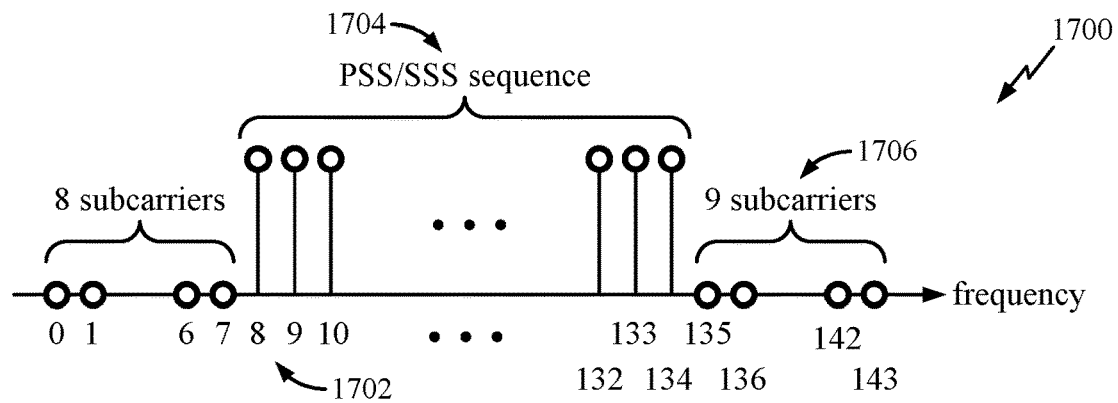
FIG. 17A illustrates an example mapping of primary synchronization signals (PSS) and secondary synchronization signals (SSS) to subcarriers in accordance with aspects of the present disclosure.

FIG. 17A illustrates an example of a mapping 1700 of PSS and SSS to subcarriers, in accordance with aspects of the present disclosure. As mentioned previously, PSS and SSS may occupy 127 subcarriers (REs of one symbol period), while a RB includes 12 subcarriers. Thus, the PSS and SSS may occupy REs in all of some RBs and a portion of other RBs. As shown at 1702, according to aspects of the present disclosure, PSS and SSS may be transmitted in the four highest subcarriers of a RB at the lower end of a band of RBs used for PSS and SSS. PSS and SSS may be transmitted all subcarriers of 10 RBs within the band of RBs used for PSS and SSS, as shown at 1704. As shown at 1706, PSS and SSS may be transmitted in the three lowest subcarriers of a RB at the upper end of the band of RBs used for PSS and SSS. Thus, PSS and SSS may be transmitted in subcarriers 8-134 of a set of subcarriers 0-143 that are included in 12 consecutive RBs.

Figure 17B:
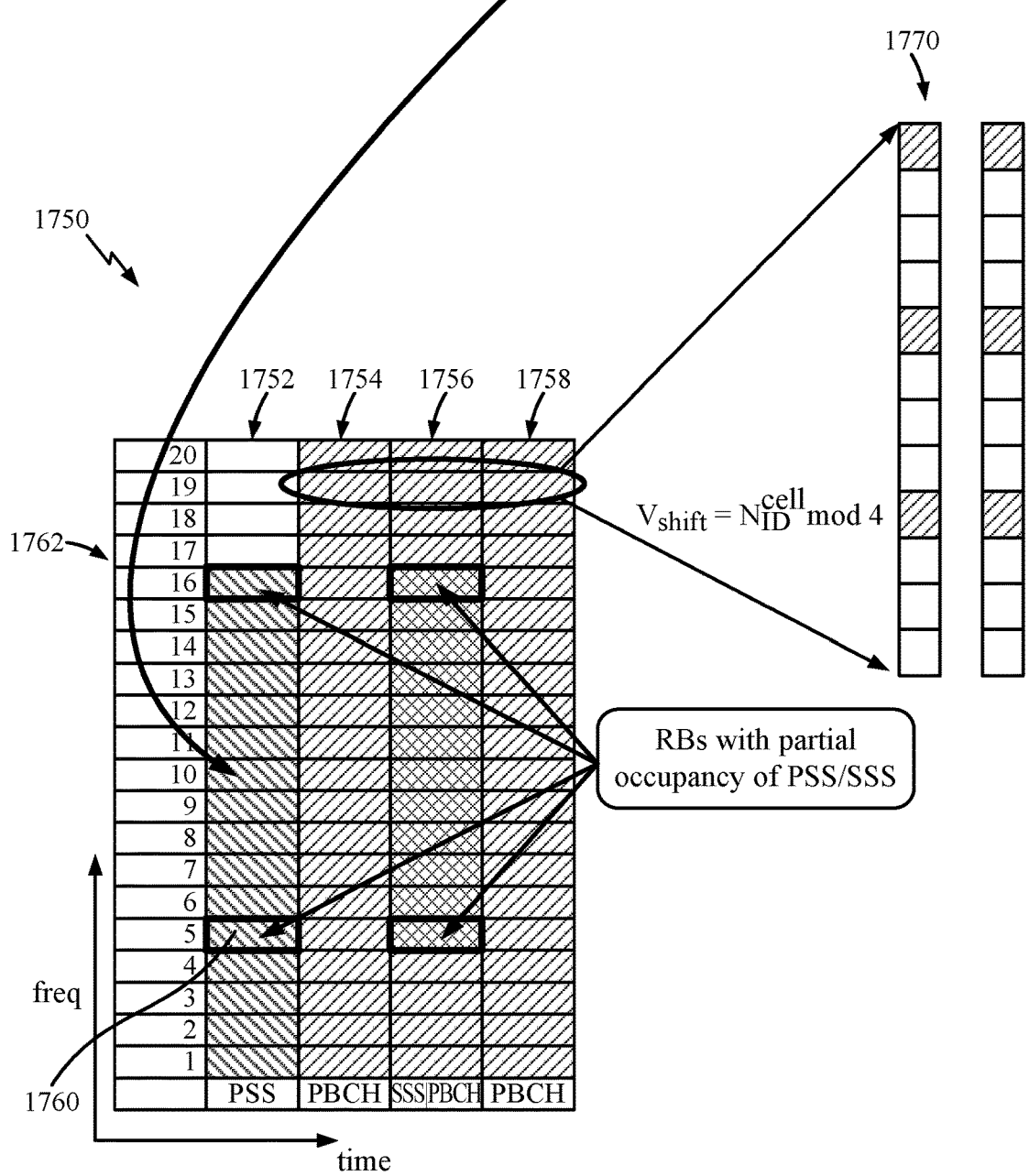
FIG. 17B illustrates an example mapping of PSS, SSS, PBCH, and DMRS to resource blocks (RBs) of a bandwidth, in accordance with aspects of the present disclosure.

FIG. 17B illustrates an example of a mapping 1750 of PSS, SSS, PBCH, and DMRS to RBs of a bandwidth, in accordance with aspects of the present disclosure. In the mapping 1750, twenty consecutive RBs of an SS transmission band are illustrated. At 1752, a mapping of PSS into twelve consecutive RBs at the center of the SS transmission band is illustrated. As mentioned above with reference to FIG. 17A, the PSS occupies each subcarrier in each of the center ten RBs of the SS transmission band, four subcarriers in the next lower RB as shown at 1760, and three subcarriers in the next upper RB as shown at 1762. A mapping of PBCH and DMRS to the twenty RBs of the SS transmission band is illustrated at 1754. At 1756, a mapping of SSS, PBCH, and DMRS to the twenty RBs of the SS transmission band is shown. As with the PSS, the SSS occupies each subcarrier in each of the center ten RBs of the SS transmission band, four subcarriers in the next lower RB as shown at 1760, and three subcarriers in the next upper RB as shown at 1762. PBCH and DMRS are transmitted on the other subcarriers of the twenty RBs of the SS transmission band. At 1758, a mapping of PBCH and DMRS to the twenty RBs of the SS transmission band is illustrated. At 1770, an exemplary mapping of PBCH and DMRS within an RB is illustrated.

While the previously disclosed aspects have been illustrated with reference to a typical network comprising BSs providing service to UEs, the present disclosure is not so limited, and aspects of the present disclosure may be applicable to a device-to-device (D2D) network (e.g., a network where a UE is taking the role of a gNB), or a backhaul network (e.g., where a relay and/or gNB is taking the role of a UE).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, means for determining, means for processing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a wireless node, comprising:
   determining, based on a frequency raster of a system frequency band, a frequency offset to use in transmitting one or more synchronization signals (SSs) and one or more physical broadcast channels (PBCHs);
   transmitting the one or more SSs, using an SS transmission band having an SS center frequency aligned with the frequency raster, and the one or more PBCHs, using a PBCH transmission band having a PBCH center frequency that differs from the SS center frequency by the determined frequency offset, wherein the PBCH transmission band is larger than the SS transmission band, and wherein the frequency offset is determined such that at least a portion of the SS transmission band is within the PBCH transmission band.

2. The method of claim 1, wherein determining the frequency offset comprises selecting the frequency offset from a plurality of frequency offsets, and the plurality of frequency offsets is preconfigured on the wireless node or indicated to the wireless node by upper layer signaling.

3. The method of claim 1, wherein:
determining the frequency offset comprises selecting the frequency offset from a plurality of frequency offsets, and
the plurality of frequency offsets is determined based on a frequency raster of a system frequency band, the system frequency band, or an operating mode of the wireless node.

4. The method of claim 1, wherein the determining comprises determining that the frequency offset is zero.

5. The method of claim 1, wherein the SS transmission band and the PBCH transmission band are within the system frequency band and the determining is further based on the system frequency band.

6. The method of claim 1, wherein the determining is further based on an indication obtained from an upper layer signal or on a time of transmitting the one or more PBCHs.

7. The method of claim 1, further comprising signaling an indication of the frequency offset via a combination of at least one of the synchronization signals and a demodulation reference signal (DMRS) for the one or more PBCHs.

8. The method of claim 1, further comprising signaling an indication of the frequency offset via at least one of a set of transmission resources used for transmitting the one or more synchronization signals or a demodulation reference signal (DMRS) for the one or more PBCHs.

9. The method of claim 1, further comprising signaling an indication of the frequency offset via at least one of a master information block (MIB), a system information block (SIB), or radio resource control (RRC) signaling.

10. The method of claim 1, further comprising signaling a value of the frequency offset.

11. The method of claim 1, wherein the determining comprises determining the frequency offset further based on a timing index of a SS block comprising the one or more synchronization signals or the one or more PBCHs.

12. The method of claim 1, wherein the determining comprises determining the frequency offset further based on a redundancy version (RV) of at least one of the one or more PBCHs.

13. The method of claim 1, further comprising:
determining one or more sequences of demodulation reference signals (DMRS) for the one or more PBCHs based at least in part on the frequency offset;
determining DMRS transmission resources for transmission of the DMRS based at least in part on the frequency offset; and
transmitting the DMRS based on the determined sequences and the determined transmission resources.

14. The method of claim 1, wherein the PBCH center frequency comprises another frequency raster of the system frequency band.

15. The method of claim 14, wherein the frequency raster and the other frequency raster are consecutive rasters of the system frequency band.

16. A method of wireless communications by a wireless node, comprising:
determining, based on a frequency raster of a system frequency band, a frequency offset; and
processing one or more synchronization signals (SSs) and one or more physical broadcast channels (PBCHs) based on an SS transmission band having an SS center frequency aligned with the frequency raster and a PBCH transmission band having a PBCH center frequency that differs from the SS center frequency by the determined frequency offset, wherein the PBCH transmission band is larger than the SS transmission band, and wherein the frequency offset is determined such that at least a portion of the SS transmission band is within the PBCH transmission band.

17. The method of claim 16, wherein determining the frequency offset comprises selecting the frequency offset from a plurality of frequency offsets, and the plurality of frequency offsets is preconfigured on the wireless node or indicated to the wireless node by an upper layer signaling.

18. The method of claim 16, wherein determining the frequency offset comprises selecting the frequency offset from a plurality of frequency offsets, and the plurality of frequency offsets is indicated to the wireless node by at least one of a master information block (MIB), a system information block (SIB), or radio resource control (RRC) signaling.

19. The method of claim 16, wherein determining the frequency offset comprises selecting the frequency offset from a plurality of frequency offsets, and the plurality of frequency offsets is determined based on a frequency raster of a system frequency band, the system frequency band, or an operating mode of the wireless node or another wireless node.

20. The method of claim 16, wherein the determining comprises determining that the frequency offset is zero.

21. The method of claim 16, wherein the SS transmission band and the PBCH transmission band are within the system frequency band and the determining is further based on the system frequency band.

22. The method of claim 16, wherein the determining is further based on an indication obtained from an upper layer signal or based on a time of processing the one or more PBCHs.

23. The method of claim 16, further comprising obtaining an indication of the frequency offset via a combination of at least one of the SSs and a demodulation reference signal (DMRS) for the one or more PBCHs.

24. The method of claim 16, further comprising obtaining an indication of the frequency offset via at least one of a set of transmission resources used for transmitting the one or more SSs or a demodulation reference signal (DMRS) for the one or more PBCHs.

25. The method of claim 16, further comprising obtaining an indication of the frequency offset via at least one of a master information block (MIB), a system information block (SIB), or radio resource control (RRC) signaling.

26. The method of claim 16, further comprising:
receiving one or more sequences of demodulation reference signals (DMRS) of the one or more PBCHs; and
determining at least part of an identifier (ID) associated with a wireless node transmitting the SS and PBCH based on at least one of the sequences transmitted on the DMRS transmission resources that overlap with the SS transmission band.

27. An apparatus for wireless communications, comprising:
- a processor configured to:
  - determine, based on a frequency raster of a system frequency band, a frequency offset for a wireless node to use in transmitting one or more SSs and one or more physical broadcast channels (PBCHs); and
  - cause the wireless node to transmit the one or more SSs, using an SS transmission band having an SS center frequency aligned with the frequency raster, and the one or more PBCHs, using a PBCH transmission band having a PBCH center frequency that differs from the SS center frequency by the determined frequency offset, wherein the PBCH transmission band is larger than the SS transmission band, and wherein the frequency offset is determined such that at least a portion of the SS transmission band is within the PBCH transmission band; and
- a memory coupled with the processor.

28. An apparatus for wireless communications, comprising:
- a processor configured to:
  - determine, based on a frequency raster of a system frequency band, a frequency offset; and
  - process one or more synchronization signals (SSs) and one or more physical broadcast channels (PBCHs) based on an SS transmission band having an SS center frequency aligned with the frequency raster and a PBCH transmission band having a PBCH center frequency that differs from the SS center frequency by the determined frequency offset, wherein the PBCH transmission band is larger than the SS transmission band, and wherein the frequency offset is determined such that at least a portion of the SS transmission band is within the PBCH transmission band; and
- a memory coupled with the processor.

* * * * *